US008150972B2

(12) United States Patent
Jackson

(10) Patent No.: US 8,150,972 B2
(45) Date of Patent: *Apr. 3, 2012

(54) SYSTEM AND METHOD OF PROVIDING RESERVATION MASKS WITHIN A COMPUTE ENVIRONMENT

(75) Inventor: David Brian Jackson, Spanish Fork, UT (US)

(73) Assignee: Adaptive Computing Enterprises, Inc., Provo, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/024,772

(22) Filed: Feb. 10, 2011

(65) Prior Publication Data

US 2011/0138056 A1 Jun. 9, 2011

Related U.S. Application Data

(63) Continuation of application No. 11/629,940, filed as application No. PCT/US2005/021427 on Jun. 17, 2005, now Pat. No. 7,890,629.

(60) Provisional application No. 60/552,653, filed on Mar. 13, 2004, provisional application No. 60/581,257, filed on Jun. 18, 2004, provisional application No. 60/586,120, filed on Jul. 7, 2004.

(51) Int. Cl.
*G06F 15/173* (2006.01)

(52) U.S. Cl. ........................................ 709/226; 709/225

(58) Field of Classification Search .................. 709/226, 709/225
See application file for complete search history.

(56) References Cited

U.S. PATENT DOCUMENTS

| | | | |
|---|---|---|---|
| 5,175,800 A | 12/1992 | Galis et al. |
| 5,307,496 A | 4/1994 | Ichinose et al. |
| 5,355,508 A | 10/1994 | Kan |
| 5,473,773 A | 12/1995 | Aman et al. |
| 5,504,894 A | 4/1996 | Ferguson et al. |
| 5,550,970 A | 8/1996 | Cline et al. |
| 5,826,082 A | 10/1998 | Bishop et al. |
| 5,881,238 A | 3/1999 | Aman et al. |
| 5,918,017 A | 6/1999 | Attanasio et al. |
| 5,933,417 A | 8/1999 | Rottoo |
| 5,958,003 A | 9/1999 | Preining et al. |
| 6,003,061 A | 12/1999 | Jones et al. |
| 6,021,425 A | 2/2000 | Waldron, III et al. |
| 6,067,545 A | 5/2000 | Wolff |
| 6,076,174 A | 6/2000 | Freund |

(Continued)

FOREIGN PATENT DOCUMENTS

GB 2392265 2/2004

(Continued)

OTHER PUBLICATIONS

Luo et al., "A Language Modeling Framework for Resource Selection and Results Merging", Conference on Information and Knowledge Management, 2002, ACM, pp. 391-397.

(Continued)

*Primary Examiner* — Minh-Chau Nguyen

(57) ABSTRACT

A system, method and computer-readable media for providing a reservation mask for compute resources such as a cluster or a grid. The method aspect comprises identifying a need type and a group of available resources, creating a reservation mask over the identified group of resources and if a request from a consumer matches the need type, then constraining the creation of a reservation for the consumer to only use resources within the reservation mask.

20 Claims, 5 Drawing Sheets

U.S. PATENT DOCUMENTS

| | | | |
|---|---|---|---|
| 6,088,718 | A | 7/2000 | Altschuler et al. |
| 6,098,090 | A | 8/2000 | Burns |
| 6,101,508 | A | 8/2000 | Wolff |
| 6,167,445 | A | 12/2000 | Gai et al. |
| 6,212,542 | B1 | 4/2001 | Kahle et al. |
| 6,298,352 | B1 | 10/2001 | Kannan et al. |
| 6,314,555 | B1 | 11/2001 | Ndumu et al. |
| 6,324,279 | B1 | 11/2001 | Kamanek, Jr. et al. |
| 6,330,008 | B1 * | 12/2001 | Razdow et al. |
| 6,330,583 | B1 | 12/2001 | Reiffin |
| 6,333,936 | B1 | 12/2001 | Johansson et al. |
| 6,366,945 | B1 | 4/2002 | Fong et al. |
| 6,370,154 | B1 | 4/2002 | Wickham |
| 6,374,297 | B1 | 4/2002 | Wolf et al. |
| 6,418,459 | B1 | 7/2002 | Gulick |
| 6,463,454 | B1 | 10/2002 | Lumelsky et al. |
| 6,496,566 | B1 | 12/2002 | Posthuma |
| 6,496,866 | B2 | 12/2002 | Attanasio et al. |
| 6,519,571 | B1 | 2/2003 | Guheen et al. |
| 6,526,442 | B1 | 2/2003 | Stupek, Jr. et al. |
| 6,564,261 | B1 | 5/2003 | Gudjonsson et al. |
| 6,571,215 | B1 | 5/2003 | Mahapatro |
| 6,584,489 | B1 | 6/2003 | Jones et al. |
| 6,587,938 | B1 | 7/2003 | Eilert et al. |
| 6,590,587 | B1 | 7/2003 | Wichelman et al. |
| 6,662,219 | B1 | 12/2003 | Nishanov et al. |
| 6,690,400 | B1 | 2/2004 | Moayyad et al. |
| 6,760,306 | B1 | 7/2004 | Pan et al. |
| 6,771,661 | B1 | 8/2004 | Chawla et al. |
| 6,829,762 | B2 | 12/2004 | Arimilli et al. |
| 6,912,533 | B1 | 6/2005 | Hornick |
| 6,925,431 | B1 | 8/2005 | Papaefstathiou |
| 6,938,256 | B2 | 8/2005 | Deng et al. |
| 6,966,033 | B1 * | 11/2005 | Gasser et al. |
| 6,975,609 | B1 | 12/2005 | Khaleghi et al. |
| 6,985,937 | B1 | 1/2006 | Keshav et al. |
| 7,003,414 | B1 | 2/2006 | Wichelman et al. |
| 7,035,230 | B1 | 4/2006 | Shaffer et al. |
| 7,072,807 | B2 | 7/2006 | Brown et al. |
| 7,124,410 | B2 | 10/2006 | Berg et al. |
| 7,143,166 | B1 | 11/2006 | Brassil |
| 7,145,995 | B2 | 12/2006 | Oltmanns et al. |
| 7,168,049 | B2 | 1/2007 | Day |
| 7,177,823 | B2 | 2/2007 | Lam et al. |
| 7,185,073 | B1 | 2/2007 | Gai et al. |
| 7,188,174 | B2 | 3/2007 | Rolia et al. |
| 7,191,244 | B2 | 3/2007 | Jennings et al. |
| 7,197,561 | B1 | 3/2007 | Lovy et al. |
| 7,222,343 | B2 | 5/2007 | Heyrman et al. |
| 7,236,915 | B2 | 6/2007 | Algieri et al. |
| 7,289,619 | B2 * | 10/2007 | Vivadelli et al. ......... 379/212.01 |
| 7,296,268 | B2 | 11/2007 | Darling et al. |
| 7,308,687 | B2 | 12/2007 | Trossman et al. |
| 7,328,406 | B2 | 2/2008 | Kalinoski et al. |
| 7,353,495 | B2 | 4/2008 | Somogyi |
| 7,376,693 | B2 | 5/2008 | Neiman et al. |
| 7,386,586 | B1 | 6/2008 | Headley et al. |
| 7,386,850 | B2 | 6/2008 | Mullen |
| 7,423,971 | B1 * | 9/2008 | Mohaban et al. ............. 370/236 |
| 7,502,747 | B1 | 3/2009 | Pardo et al. |
| 7,502,884 | B1 | 3/2009 | Shah et al. |
| 7,516,455 | B2 | 4/2009 | Matheson et al. |
| 7,546,553 | B2 | 6/2009 | Bozak et al. |
| 7,568,199 | B2 | 7/2009 | Bozak et al. |
| 7,640,547 | B2 * | 12/2009 | Neiman et al. ................ 718/104 |
| 7,716,193 | B2 | 5/2010 | Krishnamoorthy |
| 2002/0007389 | A1 | 1/2002 | Jones et al. |
| 2002/0031364 | A1 | 3/2002 | Suzuki et al. |
| 2002/0087699 | A1 * | 7/2002 | Karagiannis et al. ......... 709/227 |
| 2002/0099842 | A1 | 7/2002 | Jennings et al. |
| 2002/0116234 | A1 | 8/2002 | Nagasawa |
| 2002/0120741 | A1 | 8/2002 | Webb et al. |
| 2002/0156904 | A1 | 10/2002 | Gullotta et al. |
| 2002/0166117 | A1 | 11/2002 | Abrams et al. |
| 2003/0005130 | A1 | 1/2003 | Cheng |
| 2003/0018766 | A1 | 1/2003 | Duvvuru |
| 2003/0018803 | A1 | 1/2003 | El Batt et al. |
| 2003/0028645 | A1 | 2/2003 | Romagnoli |
| 2003/0061260 | A1 * | 3/2003 | Rajkumar ..................... 709/104 |
| 2003/0061262 | A1 * | 3/2003 | Hahn et al. |
| 2003/0088457 | A1 | 5/2003 | Keil et al. |
| 2003/0126200 | A1 | 7/2003 | Wolff |
| 2003/0131043 | A1 | 7/2003 | Berg et al. |
| 2003/0135615 | A1 | 7/2003 | Wyatt |
| 2003/0135621 | A1 * | 7/2003 | Romagnoli |
| 2003/0154112 | A1 | 8/2003 | Neiman et al. |
| 2003/0158884 | A1 * | 8/2003 | Alford |
| 2003/0169269 | A1 | 9/2003 | Sasaki et al. |
| 2003/0182425 | A1 * | 9/2003 | Kurakake ...................... 709/226 |
| 2003/0185229 | A1 | 10/2003 | Shachar et al. |
| 2003/0200109 | A1 | 10/2003 | Honda et al. |
| 2003/0212792 | A1 | 11/2003 | Raymond |
| 2003/0216951 | A1 * | 11/2003 | Ginis et al. ......................... 705/8 |
| 2003/0217129 | A1 | 11/2003 | Knittel et al. |
| 2003/0233378 | A1 | 12/2003 | Butler et al. |
| 2003/0233446 | A1 | 12/2003 | Earl |
| 2004/0030741 | A1 | 2/2004 | Wolton et al. |
| 2004/0044718 | A1 | 3/2004 | Ferstl et al. |
| 2004/0064817 | A1 * | 4/2004 | Shibayama et al. |
| 2004/0103339 | A1 | 5/2004 | Chalasani et al. |
| 2004/0103413 | A1 | 5/2004 | Mandava et al. |
| 2004/0107281 | A1 | 6/2004 | Bose et al. |
| 2004/0117768 | A1 * | 6/2004 | Chang et al. |
| 2004/0139202 | A1 | 7/2004 | Talwar et al. |
| 2004/0139464 | A1 | 7/2004 | Ellis et al. |
| 2004/0196308 | A1 | 10/2004 | Blomquist |
| 2004/0205101 | A1 | 10/2004 | Radhakrishnan |
| 2004/0215780 | A1 | 10/2004 | Kawato |
| 2004/0236852 | A1 | 11/2004 | Birkestrand et al. |
| 2004/0244006 | A1 | 12/2004 | Kaufman et al. |
| 2004/0260746 | A1 | 12/2004 | Brown et al. |
| 2005/0050270 | A1 | 3/2005 | Horn et al. |
| 2005/0071843 | A1 | 3/2005 | Guo et al. |
| 2005/0155033 | A1 | 7/2005 | Luoffo et al. |
| 2005/0256942 | A1 | 11/2005 | McCardle et al. |
| 2005/0278760 | A1 | 12/2005 | Dewar et al. |
| 2005/0283534 | A1 | 12/2005 | Bigagli et al. |
| 2005/0283782 | A1 | 12/2005 | Lu et al. |
| 2006/0013132 | A1 | 1/2006 | Garnett et al. |
| 2006/0097863 | A1 | 5/2006 | Horowitz et al. |
| 2006/0200773 | A1 | 9/2006 | Nocera et al. |
| 2006/0236368 | A1 | 10/2006 | Raja et al. |
| 2006/0271552 | A1 | 11/2006 | McChesney et al. |
| 2006/0294238 | A1 | 12/2006 | Naik et al. |
| 2007/0204036 | A1 | 8/2007 | Mohaban et al. |
| 2008/0168451 | A1 | 7/2008 | Challenger et al. |
| 2008/0184248 | A1 | 7/2008 | Barua et al. |
| 2008/0216082 | A1 * | 9/2008 | Eilam et al. ................... 718/104 |
| 2008/0288873 | A1 | 11/2008 | McCardle et al. |
| 2009/0216881 | A1 | 8/2009 | Lovy et al. |

FOREIGN PATENT DOCUMENTS

| | | |
|---|---|---|
| WO | WO 03/060798 | 9/2003 |
| WO | WO 2004/021109 A | 3/2004 |
| WO | WO 2004/046919 A | 6/2004 |

OTHER PUBLICATIONS

Si et al., "Language Modeling Framework for Resource Selection and Results Merging", SIKM 2002, Proceedings of the eleventh international conference on information and Knowledge Management.

Leinberger, W. et al., "Gang Scheduling for Distributed Memory Systems", University of Minnesota—Computer Science and Engineering—Technical Report, Feb. 16, 2000, vol. TR 00-014.

Lars C. Wolf et al., "Concepts for Resource Reservation in Advance", Multimedia Tools and Applications, [Online] 1997, pp. 255-278, XP009102070, The Netherlands Retrieved from the Internet. URL: http://www.springerlink.com/content/h25481221mu22451/fulltext.pdf [retrieved on Jun. 23, 2008].

Chuang Liu et al., "Design and Evaluation of a Resource Selection Framework for Grid Applications", High Performance Distributed Computing, 2002, HPDC-11 2002, Proceedings S. 11th IEEE International Symposium on Jul. 23-26, 2002, Piscataway, NJ, USA IEEE, Jul. 23, 2002, pp. 63-72, XP010601162 ISBN: 978-0-7695-1686-8.

Brad Stone et al., UNIX Fault Management: A Guide for System Administration, Dec. 1, 1999, ISBN 0-13-026625-X, http://www.informit.com/content/images/013026525X/samplechapter/013026525.pdf.

IBM Tivoli Workload Scheduler job Scheduling Console User's Guide Feature Level 1.2 (Maintenance Release Oct. 2003), IBM Corporation, http://publib.boulder.ibm.com/tividd/td/TWS/SH19-4552-01/en_US/PDF/jsc_user.pdf.

Chen et al., "A flexible service model for advance reservation", Computer Networks, Elsevier science publishers, vol. 37, No. 3-4, pp. 251-262, Nov. 5, 2001.

Roy, Alain, "Advance Reservation API*, University of Wisconsin-Madison", GFD-E5, Scheduling Working Group, May 23, 2002.

Supercluster Research and Development Group, "Maui Administrator's Guide", Internet citation, 2002.

Snell, et al., "The Performance Impact of Advance Reservation Meta-scheduling", pp. 137-153, Springer-Verlag Berlin Heidelberg, 2000.

* cited by examiner

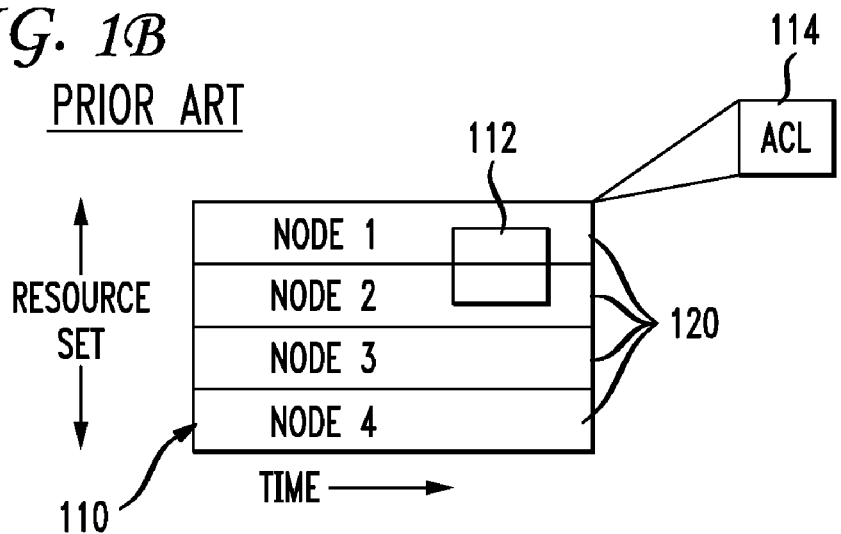
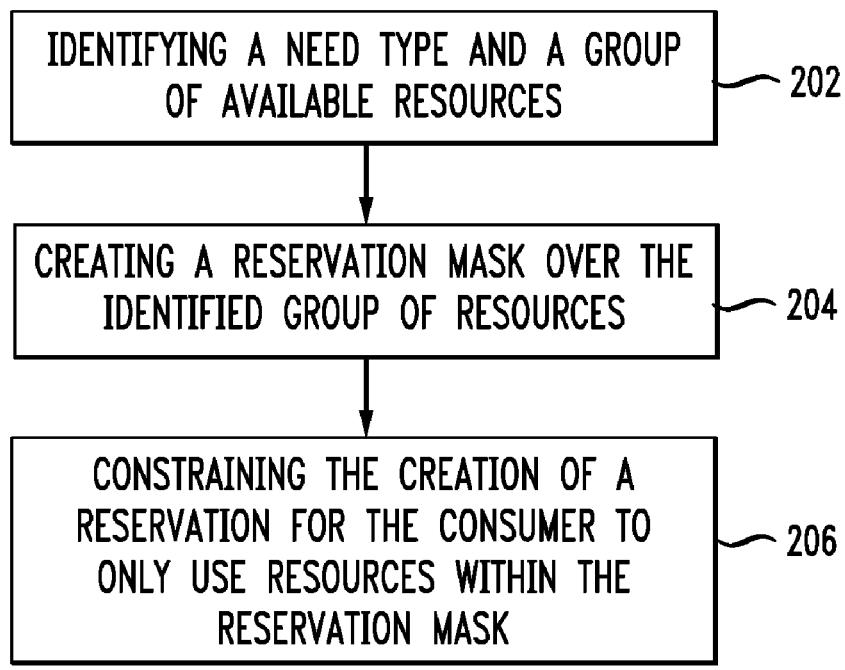

SYSTEM AND METHOD OF PROVIDING RESERVATION MASKS WITHIN A COMPUTE ENVIRONMENT

PRIORITY CLAIM

The present application is a continuation of U.S. patent application Ser. No. 11/629,940, filed Dec. 18, 2006, which is a 371 of PCT/US2005/021427, filed Jun. 17, 2005, which claims priority to U.S. Provisional Application No. 60/581, 257 filed Jun. 18, 2004, U.S. Provisional Application No. 60/552,653, filed Mar. 13, 2004 and U.S. Provisional Application No. 60/586,120, filed Jul. 7, 2004, the contents of which are incorporated herein by reference.

BACKGROUND

1. Field of the Disclosure

The present invention relates to reservations in a compute environment such as a cluster and more specifically to a system and method of providing reservation masks to manage resources in a compute environment.

2. Introduction

The present invention relates to a system and method of managing compute resources in the context of a grid or cluster of computers. Grid computing may be defined as coordinated resource sharing and problem solving in dynamic, multi-institutional collaborations. Many computing projects require much more computational power and resources than a single computer or single processor may provide. Networked computers with peripheral resources such as printers, scanners, I/O devices, storage disks, scientific devices and instruments, etc. may need to be coordinated and utilized to complete a task.

Grid/cluster resource management generally describes the process of identifying requirements, matching resources to applications, allocating those resources, and scheduling and monitoring grid resources over time in order to run cluster/grid applications or jobs as efficiently as possible. Each project will utilize a different set of resources and thus is typically unique. In addition to the challenge of allocating resources for a particular job, administrators also have difficulty obtaining a clear understanding of the resources available, the current status of the cluster/grid and available resources, and real-time competing needs of various users. One aspect of this process is the ability to reserve resources for a job. A cluster manager will seek to reserve a set of resources to enable the cluster to process a job at a promised quality of service.

General background information on clusters and grids may be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable in that there is no specific definition of either. The term compute environment may apply to a cluster, a grid or variations on the general concepts of clusters or grids. The definition of a cluster or grid is very flexible and may refer to a number of different configurations of computers. The introduction here is meant to be general given the variety of configurations that are possible. In general, a grid will comprise a plurality of clusters as will be shown in FIG. 1A. Several challenges exist when attempting to maximize resources in a compute environment. First, there are typically multiple layers of grid and cluster schedulers. A grid 100 may comprise a group of clusters or a group of networked computers within a particular administrative control. A grid scheduler 102 communicates with a plurality of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which may refer to either the cluster schedulers 104 or the resource managers 106) are closer to the specific resources 108 and may not allow grid schedulers 102 direct access to the resources. Examples of compute resources include data storage devices such as hard drives and computer processors. The grid level scheduler 102 typically does not own or control the actual resources. Therefore, jobs are submitted from the high level grid-scheduler 102 to a local set of resources with no more permissions that the user would have. This reduces efficiencies and can render the reservation process more difficult.

The heterogeneous nature of the shared resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies may also play a role in performance.

Within a given cluster, there is only a concept of resource management in space. An administrator can partition a cluster and identify a set of resources to be dedicated to a particular purpose and another set of resources can be dedicated to another purpose. In this regard, the resources are reserved in advance to process the job. There is currently no ability to identify a set of resources over a time frame for a purpose. By being constrained in space, the nodes 108A, 108B, 108C, if they need maintenance or for administrators to perform work or provisioning on the nodes, have to be taken out of the system, fragmented permanently or partitioned permanently for special purposes or policies. If the administrator wants to dedicate them to particular users, organizations or groups, the prior art method of resource management in space causes too much management overhead requiring constant adjustment to the configuration of the cluster environment and also losses in efficiency with the fragmentation associated with meeting particular policies.

To manage the jobs submissions, a cluster scheduler will employ reservations to insure that jobs will have the resources necessary for processing. FIG. 1B illustrates a cluster/node diagram for a cluster 110 with nodes 120. Time is along the X axis. An access control list 114 (ACL) to the cluster is static, meaning that the ACL is based on the credentials of the person, group, account, class or quality of service making the request or job submission to the cluster. The ACL 114 determines what jobs get assigned to the cluster 110 via a reservation 112 shown as spanning into two nodes of the cluster. Either the job can be allocated to the cluster or it can't and the decision is determined based on who submits the job at submission time. The deficiency with this approach is that there are situations in which organizations would like to make resources available but only in such a way as to balance or meet certain performance goals. Given the prior art model, companies are unable to have the needed or required flexibility over their cluster resources. To improve the management of cluster resources, what is needed in the art is a method for a module associated with administrative software that controls compute resources within a compute environment to manage reservations within the compute environment more efficiently and with more flexibility.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein. The present invention addresses the need to manage the reservation process with more flexibility and efficiency. The invention introduces the concept of reservation masks and comprises a method, system, and a computer-readable medium for managing compute resources by creating reservation masks over an identified group of compute resources. The method manages compute resources within a compute environment by identifying a need type and a group of available compute resources, creating a reservation mask over the identified group of compute resources and if a request from a consumer matches the need type, then constraining the creation of a sub-reservation for the consumer to only use compute resources within the reservation mask. A set of reservation masks may be created as well, wherein multiple sub-reservations from multiple consumer requests will each be constrained to only use compute resources within the set of reservation masks. In one aspect of the invention, the mask is a policy-enforcing mechanism to manage and constrain reservations.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1B illustrates a job submitted to a resource set in a computing environment;

FIG. 2A illustrates a method of creating a reservation mask;

DETAILED DESCRIPTION

Figure 1A:
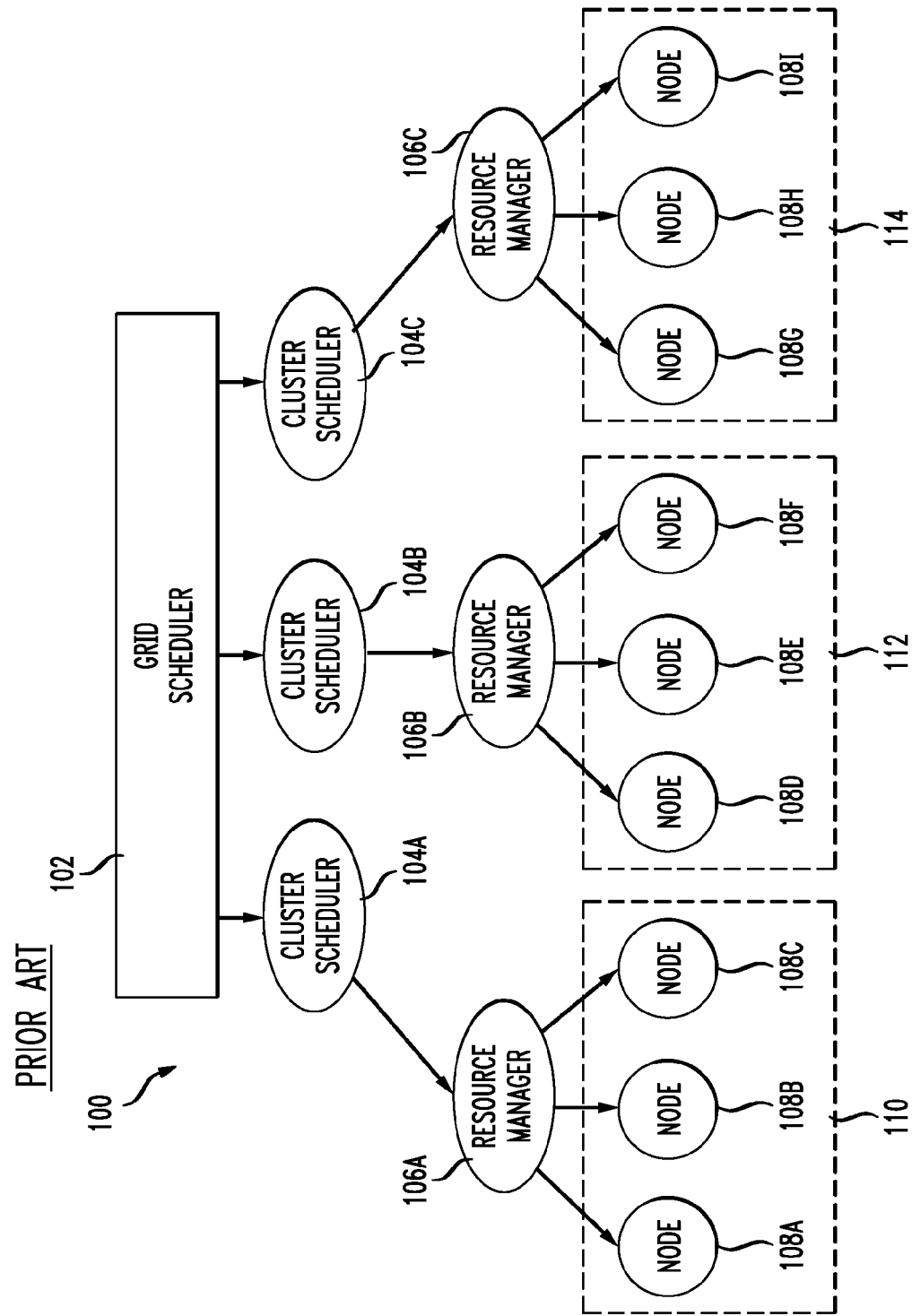
FIG. 1A illustrates generally a grid scheduler, cluster scheduler, and resource managers interacting with compute nodes.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention relates to resource reservations in the context of a compute environment. The environment may be operated by a hosting facility, hosting center, a virtual hosting center, data center, grid, cluster and/or utility-based computing environments. The system aspect of the invention comprises a computing device that operates software that practices the steps of the invention to manage compute resources. There are many known types of computing devices that are known to those of skill in the art and that are acceptable as the system embodiment of the invention. The computing device may be a single device or a plurality of connected computing devices that enable the invention to be practiced. The software operating within the system is comprised of computer program modules written in a computing language, such as the C programming language or any other suitable programming language. The programming modules include all the necessary programming to communicate with the compute environment (i.e., such as the cluster/grid) and both receive information about the compute resources within the compute environment and also manage the reservation and use of those compute resources. The primary invention disclosed herein relates to the concept of the reservation mask. Therefore, the system embodiment of the invention will include the various modules that are configured to control a processor to practice the steps of the method embodiment of the invention disclosed herein. For example, a system for managing compute resources within a compute environment may comprise means for identifying a need type and a group of available resources, means for creating a reservation mask over the identified group of resources and means for constraining the creation of a sub-reservation associated with a request from a consumer that matches the need type. The means for performing this may be, as mentioned above, computer programmed modules within a software package that are configured to control the processor to perform these steps.

Prior to discussing the reservation masks according to the invention, some other explanatory information is provided about reservations and the access control list.

The present invention allows the ACL for the reservation to have a dynamic aspect instead of simply being based on who the requester is. The ACL decision making process is based at least in part on the current level of service or response time that is being delivered to the requester. To illustrate the operation of the ACL, assume that a user submits a job and that the ACL reports that the only jobs that can access these resources are those that have a queue time that currently exceeds two hours. If the job has sat in the queue for two hours it will then access the additional resources to prevent the queue time for the user from increasing significantly beyond this time frame. The decision to allocate these additional resources can be keyed off of utilization of an expansion factor and other performance metrics of the job.

Whether or not an ACL is satisfied is typically and preferably determined by the scheduler 104A. However, there is no restriction in the principle of the invention regarding where or on what node in the network the process of making these allocation of resource decisions occurs. The scheduler 104A is able to monitor all aspects of the request by looking at the current job inside the queue and how long it has sat there and what the response time target is and the scheduler itself determines whether all requirements of the ACL are satisfied. If requirements are satisfied, it releases the resources that are available to the job. A job in the queue can then consume resources and the scheduler communicates this to the scheduler 104A. If resources are allocated, the job is taken from the queue and inserted into the reservation in the cluster.

An example benefit of this model is that it makes it significantly easier for a site to balance or provide guaranteed levels of service or constant levels of service for key players or the general populace. Setting aside certain resources and only making them available to the jobs which threaten to violate their quality of service targets increases the probability of satisfying the targets.

The disclosure now continues to discuss reservations further. An advance reservation is the mechanism by which the present invention guarantees the availability of a set of resources at a particular time. With an advanced reservation a site now has an ability to actually specify how the scheduler should manage resources in both space and time. Every reservation consists of three major components, a list of resources, a timeframe (a start and an end time during which it is active), and an access control list (ACL). These elements are subject to a set of rules. The ACL acts as a doorway determining who or what can actually utilize the resources of the cluster. It is the job of the cluster scheduler to make certain that the ACL is not violated during the reservation's lifetime (i.e., its timeframe) on the resources listed. The ACL governs access by the various users to the resources. The ACL does this by determining which of the jobs, various groups, accounts, jobs with special service levels, jobs with requests for specific resource types or attributes and many different aspects of requests can actually come in and utilize the resources. With the ability to say that these resources are reserved, the scheduler can then enforce true guarantees and can enforce policies and enable dynamic administrative tasks to occur. The system greatly increases in efficiency because there is no need to partition the resources as was previously necessary and the administrative overhead is reduced it terms of staff time because things can be automated and scheduled ahead of time and reserved.

As an example of a reservation, a reservation may specify that node002 is reserved for user John Doe on Friday. The scheduler will thus be constrained to make certain that only John Doe's jobs can use node002 at any time on Friday. Advance reservation technology enables many features including backfill, deadline based scheduling, QOS support, and meta scheduling.

There are several reservation concepts that will be introduced as aspects of the invention. These include dynamic reservations, co-allocating reservation resources of different types, reservations that self-optimize in time, reservations that self-optimize in space, reservations rollbacks and reservation masks. The main focus of the present invention is the reservation mask.

Dynamic reservations are reservations that are able to be modified once they are created. Attributes of a reservation may change based on a feedback mechanism that adds intelligence as to ideal characteristics of the reservation and how it should be applied as the context of its environment or an entities needs change. One example of a dynamic reservation is a reservation that provides for a guarantee of resources for a project unless that project is not using the resources it has been given. A job associated with a reservation begins in a cluster environment. At a given portion of time into processing the job on compute resources, the system receives compute resource usage feedback relative to the job. For example, a dynamic reservation policy may apply which says that if the project does not use more than 25% of what it is guaranteed by the time that 50% of its time has expired, then, based on the feedback, the system dynamically modifies the reservation of resources to more closely match the job. In other words, the reservation dynamically adjust itself to reserve X % fewer resources for this project, thus freeing up unused resources for others to use.

Another dynamic reservation may perform the following step: if usage of resources provided by a reservation is above 90% with fewer than 10 minutes left in the reservation then the reservation will attempt to add 10% more time to the end of the reservation to help ensure the project is able to complete. In summary, it is the ability for a reservation to receive manual or automatic feedback to an existing reservation in order to have it more accurately match any given needs, whether those be of the submitting entity, the community of users, administrators, etc. The dynamic reservation improves the state of the art by allowing the ACL to the reservation to have a dynamic aspect instead of simply being based on who the requestor is. The reservation can be based on a current level of service or response time being delivered to the requestor.

Another example of a dynamic reservation is consider a user submitting a job and the reservation may need an ACL that requires that the only job that can access these resources are those that have a queue time that is currently exceeded two hours. If the job has sat in the queue for two hours it will then access the additional resources to prevent the queue time for the user from increasing significantly beyond this time frame. You can also key the dynamic reservation off of utilization, off of an expansion factor and other performance metrics of the job.

The ACL and scheduler are able to monitor all aspects of the request by looking at the current job inside the queue and how long it has sat there and what the response time target is. It is preferable, although not required, that the scheduler itself determines whether all requirements of the ACL are satisfied. If the requirements are satisfied, the scheduler releases the resources that are available to the job.

The benefit of this model is that it makes it significantly easier for a site to balance or provide guaranteed levels of service or constant levels of service for key players or the general populace. Setting aside certain resources and only making them available to the jobs which threaten to violate their quality of service target increases the probability of satisfying those targets.

Another reservation type is a self optimizing reservation in time. In many cases, people will request resources and request that they be available at a particular time. For example, a person is doing a demonstration and it happens to be from 2:00 pm to 4:00 pm. In many other cases, people will simply have a deadline or simply want processing as early as possible. With a self-optimizing in time reservation, the scheduler is actually able to lock in a set of resources for a particular request and then over time evaluate the cluster resources and determine if it can actually improve on it and improve on the reservation in such a way as to guarantee that it does not lose the resources that it has already made available.

With self-optimizing reservations in time, a particular request may come in requesting resources that meet the following criteria but the requester prefers resources that meet a more increasingly strict criteria. The scheduler, in finding the reservation, may be able to satisfy the required criteria but not necessarily satisfy all the preferred criteria. Over time, the scheduler, once it has established a reservation that meets the minimum criteria, it can continue to look at newly freed up resources and determine if it can, to a larger and larger extent, satisfy the preferred resource needs as well. This self optimizing reservation technology is also useful to work around resource failures in the case of a reservation that has already had reserved all the resources it needs and it has a node failure. It can actually continue to locate resources and reallocate resources that are still up and running and be able to satisfy the time frame it originally promised by excluding the failed node and picking up a newly available compute node.

With the above concepts about reservations and the ACL in mind, the reservation mask is next introduced. FIG. 2A illustrates the steps taken to provide a reservation mask for compute resources. The method comprises identifying a need type and a group of available resources (202), creating a reservation mask over the identified group of resources (204) and if a request from a consumer matches the need type, then constraining the creation of a sub-reservation for the consumer to only use resources within the reservation mask (206). The reservation mask therefore has a different purpose from the reservation itself. The mask is a policy-enforcing mechanism to manage and constrain reservations. Identifying a need type and a group of available resources may be based on an administrative policy or some other criteria. The sub-reservation may be constrained by independent, non-administrative criteria, such as the quantity of resources and on a per-credential basis. For example, the constraints may limit each member of a group to six processors at a time. If the request from a requestor matches the need type, then the creation of the sub-reservation may be constrained at least according to credentials associated with the request. The credentials may be at least one of: per user credential, per group credential, per class credential, quality of service-based credential and a partition-based credential. There are preferably policies that impose these constraints upon the sub-reservations. These types of independent limits on non-administrative reservations do not really have anything to do with the reservation mask but relate to the ability to limit the creation of reservations with or without the masks according to the per-credential policy. In other words, the per person, per group, per class, per QOS, per partition, etc. policy that imposes these constraints. In this case, these constraints only apply to a personal or a grid reservation and not to administrative reservations.

The sub-reservation (or simply, the reservation) may be dynamically modified according to received data such as resource usage, system performance, a policy and a criterion associated with the request. For example, if resource usage is low, the sub-reservation may be dynamically modified to use 8 more processors which are not being used to more efficiently use the resources and more quickly complete the task. Such modifications may be bounded by minimum thresholds and maximum thresholds such as load metrics or system performance parameters. Modifying the sub-reservation may involve several things. For example, the ACL may be modified, the reserved resources may be modified, and the time frame covered may be modified. Other modifications may be made as well to further improve the completion of the task either from a job standpoint or a compute environment standpoint.

If a request from the consumer does not match the need type, then no constraints are enforced for creating a reservation for the request from the consumer. Creating the reservation mask may also involve specifying at least one timeframe during which the reservation mask enforces constraints, such as during business hours, eastern time. The time frame may also be a plurality of independent or periodic time frames. The method may also provide for specifying an access control list that constrains which consumers or resource requests may utilize resources within the reservation mask. The request from the consumer or requestor is typically placed within the access control list. The need type may refer to a particular use, a user, a group of users, a job source, a type of job submission, personal reservation, grid reservation, cluster reservation and so forth.

A personal reservation, for example, may consist of a reservation that dedicates resource access to a specific user or group of users. One aspect of the personal reservation or reservation from a consumer is that is it is a non-administrator request. If the personal reservation provides access to resources to a group of users, then each reservation and reservation timeframe are determined by a user in the group of users that requests the respective reservation. Where there are administrator requests and personal requests that may be submitted, the administrator requests may be different in one aspect in that they are not constrained within the reservation mask. A grid reservation is a reservation requested from outside an administrative group. When a grid reservation is received (a grid-based request) and established, the system protects or guarantees the resource availability for a job that is remotely created from the local compute resources.

Figure 2B:
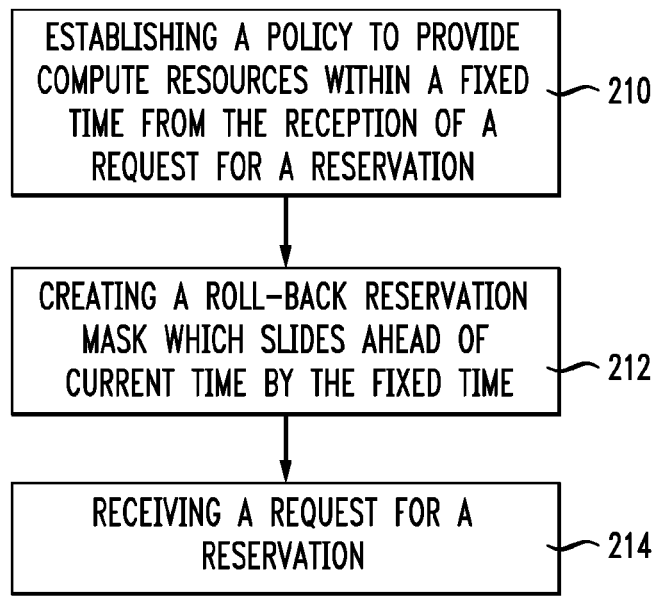
FIG. 2B illustrates a method of providing a roll-back reservation mask.

Another aspect of reservation relates to a roll-back reservation in time or a roll-back reservation mask. FIG. 2B illustrates this method embodiment of the present invention. The method of managing compute resources within a compute environment comprises establishing a policy to provide compute resources within a fixed time from the reception of a request for a reservation (210), creating a roll-back reservation mask which slides ahead of current time by the fixed time (212) and receiving a request for a reservation (214). Upon receiving the request for a reservation, the roll-back reservation mask insures that compute resources will be available for reservation within the fixed time according to the policy. The policy may be established according to an agreement with a requestor of compute resources and the provider or manager of the compute resources. An example policy would insure that the requestor of resources may be able to reserve and have at a predetermined quality of service, 100 nodes, 3 GB of memory and a certain bandwidth of communication within six hours of a request.

The compute environment is a cluster or a grid or any other grouping of compute devices or compute nodes. Within the roll-back reservation mask, the mask analyzes compute resources according to the policy to insure that compute resources may be reserved by the requestor within the fixed period of time. An example of the request for a reservation is a consumption request, where a user desires to process a submitted job using the compute resources. After receiving the reservation request, the roll-back reservation mask reserves the appropriate compute resources according to the request and the policy such that within the fixed amount of time, the requestor has access to his or her reserved resources.

The reservation mask can also be self-optimizing. Given that there is sufficient time to analyze the request or reservation and the compute resources, the reservation mask may analyze whether a level of service can be improved for the reservation request and if the level of service can be improved, then the mask cancels the reservation of compute resources and reserves a second group of compute resources. The mask or some other compute process may perform some of these steps. This self-optimization process of modifying or canceling and re-issuing reservations to improve performance of either the compute environment or the quality of service delivered to the requestor may occur until a predetermined point. For example, assume the policy requires that the requestor have resources reserved and available for use within one hour of the request. If the requestor requests a reservation for three hours into the future, the roll-back reservation mask has two hours until the fixed guaranteed time to optimize the request. When the time comes where the request needs to be honored within one hour, one aspect of the invention requires the reservation to be set and thus not "covered" by the reservation mask. The reservation in this sense has slipped out from underneath the reservation mask. This is shown by the reservations 406 in FIG. 4 and FIG. 5.

The roll-back reservation mask 402, 502 has a length preferably based on the agreement. This may be, for example, a several months or it may be indefinite or of infinite length. Preferably, the length of the mask 402, 502 is associated with how far into the future it analyzes compute resources and a height associated with a guaranteed throughput.

Figure 3A:
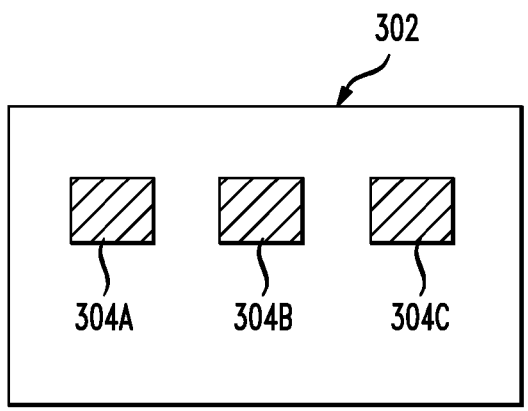
FIG. 3A illustrates a reservation mask.

FIG. 3A illustrates a standing reservation. In cluster 302, there are standing reservations shown as 304A, 304B and 304C. These reservations show resources allocated and reserved on a periodic basis. These are consuming reservations meaning that cluster resources will be consumed by the reservation.

A reservation mask, mentioned above, allows a compute site to create "sandboxes" in which other guarantees can be made. The most common aspects of this reservation are for grid environments and personal reservation environments. In a grid environment, a remote entity will be requesting resources and will want to use these resources on an autonomous cluster for the autonomous cluster to participate. In many cases it will want to constrain when and where the entities can reserve or utilize resources. One way of doing that is via the reservation mask.

Figure 3B:
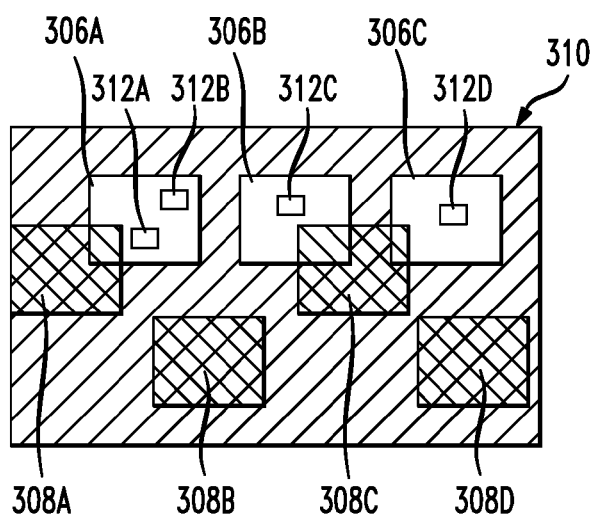
FIG. 3B illustrates another aspect of the reservation mask.

FIG. 3B illustrates the reservation mask shown as creating sandboxes 306A, 306B, 306C in cluster 310 and allowing the autonomous cluster to state that only a specific subset of resources can be used by these remote requesters during a specific subset of times. When a requester asks for resources, the scheduler will only report and return resources available within this reservation mask, after which point if the remote entity wants to use the resources, it can actually make a consumption reservation and that reservation is guaranteed to be within the reservation mask space. The consumption reservations 312A, 312B, 312C, 312D are shown within the reservation masks.

In cluster 310 the reservation masks operate differently from consuming reservations in that they are enabled to allow personal reservations to be created within the space that is reserved. ACL's are independent inside of a sandbox reservation or a reservation mask in that you can also exclude other requesters out of those spaces so they dedicated for these particular users.

The benefits of this approach include preventing local job starvation, and providing a high level of control to the cluster manager in that he or she can determine exactly when, where, how much and who can use these resources even though the manager doesn't necessarily know who the requesters are or the combination or quantity of resources they will request. The administrator can determine when, how and where requestors will participate in these grids. A valuable use is in the space of personal reservations which typically involves a local user given the authority to reserve a block of resources for a rigid time frame. Again, with a personal reservation mask, the requests are limited to only allow resource reservations within the mask time frame and mask resource set, providing again the administrator the ability to constrain exactly when and exactly where and exactly how much of resources individual users can reserve for a rigid time frame. The individual user is not known ahead of time but it is known to the system, but it typically a standard local cluster user.

The reservation masks 306A, 306B and 306C define periodic, personal reservation masks where other reservations in a cluster 310 may be created, i.e., outside the defined boxes. These are provisioning or policy-based reservations in contrast to consuming reservations. In this regard, the resources in this type of reservation are not specifically allocated but the time and space defined by the reservation mask cannot be reserved for other jobs. Reservation masks enable the system to be able to control the fact that resources are available for specific purposes, during specific time frames. The time frames may be either single time frames or regular, repeating time frames to dedicate the resources to meet project needs, policies, guarantees of service, administrative needs, demonstration needs, etc. This type of reservation insures that reservations are managed and scheduled in time as well as space. Boxes 308A, 308B, 308C and 308D represent non-personal reservation masks. They have the freedom to be placed anywhere in cluster including overlapping some or all of the reservation masks 306A, 306B, 306C. Overlapping is allowed when the personal reservation mask was setup with a global ACL. To prevent the possibility of an overlap of a reservation mask by a non-personal reservation, the administrator can set an ACL to constrain it so that only personal consumption reservations are inside. These personal consumption reservations are shown as boxes 312A, 312B, 312C, 312D which are constrained to be within the personal reservation masks 306A, 306B, 306C. The 308A, 308B, 308C and 308D reservations, if allowed, can go anywhere within the cluster 310 including overlapping the other personal reservation masks. The result is the creation of a "sandbox" where only personal reservations can go without in any way constraining the behavior of the scheduler to schedule other requests. The ACL is preferably the mechanism that constrains which consumer or resource requests may utilize resources within the reservation mask.

Figure 4:
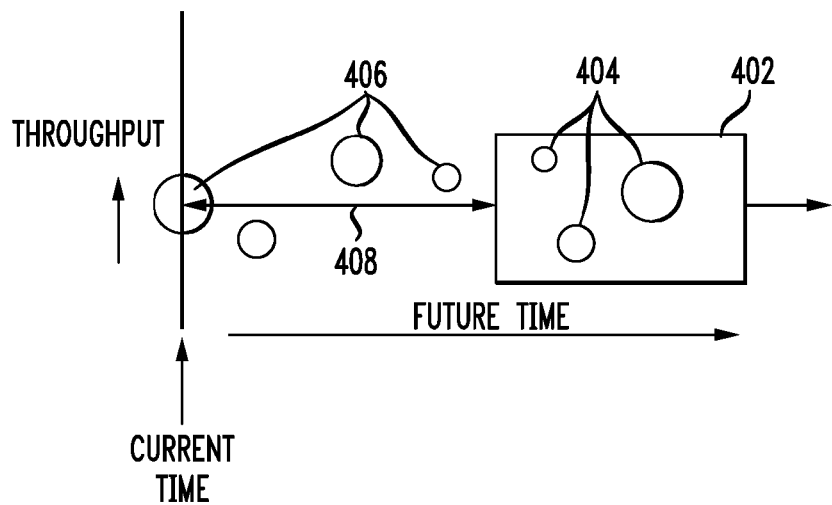
FIG. 4 illustrates a floating reservation.

Another reservation type is the roll-back reservation mask shown in FIG. 4. This reservation mask has particular application for enforcing policies or allowing support for service level guarantees in service level agreements. A level of service guarantee allows a site, cluster or grid to guarantee that a particular consumer or organization or type of credential is guaranteed a certain quantity of resources within a certain amount of time. The standard way to provide those guarantees would be to dedicate a block of resources that satisfies the needs and would be statically and rigidly partitioned so that no one else could access it. The request of that organization could not extend beyond the bounds of the dedicated block.

A self optimizing reservation will only slide forward barring resource failure of the actual compute resources. It does this by, when it makes a query to determine what resources are available, as part of its algorithm, it determines that it has availability to both free resources and the resources it already has reserved. In such a case in then goes and analyzes it, looks at resources that were recently freed by other workload and other reservations that completed early which is actually quite common in a cluster environment, and if it can find that it can improve the level of service delivered to the request or it will actually create the new reservation and will remove the old reservation and adjust things as needed. A self optimizing reservation therefore has the ability to improve any given attribute of service to the submitting entity, community of users, administrators, etc.

With the present invention regarding the reservation rollback, an administrator can create a reservation mask 402 which enforces its policy and continues to float in time a certain distance 408 ahead of the current time. Typically, the rectangular area of the reservation mask has a height that corresponds to guaranteed throughput when processing jobs and the horizontal distance that corresponds to the length in time of the reservation mask. The reservation mask 402 may correspond to a certain amount of time according to a service level agreement, such as 3 or 4 months for example. The reservation mask 402 may extend into infinity as well if there is no defined ending time. The reservation mask 402 is a provisioning reservation and maintains the time offset 408 to the current time.

To illustrate the reservation roll-back, consider a service level agreement with a company to have twenty resources available within one hour of the request for the resources and that they can make the request anytime. The time offset 408 can then be set to one hour and the company will never will they wait more than one hour to get up to twenty compute resources. The reservation mask 402 monitors the resources and when a request is made for resources, consumption reservations 404 are allocated and left behind 406 as the roll-back reservation mask maintains its offset. Those that are left behind are not "covered" by the reservation mask 402 any longer.

An implementation with reservation rollback mask allows a site to set up basically a floating reservation that extends from one hour in the future until a time further in the future, such as 4 or 8 hours in the future, and continues to slide forward in time. The reservation mask 402 will only allow jobs from this organization into the space and can drop down requests or reserve host resources underneath the reservation mask. As time moves forward, the reservation mask slides forward in time so it always maintains a constant distance in the future allowing these guarantees 404 to be created and maintained 406 on the cluster.

The time offset 408 may be static or dynamic. A static offset 408 will maintain a constant offset time, such as one hour into the future. The static offset will likely be set by a service level agreement wherein a company requests that the resources become available within an hour. The offset 408 may also by dynamic. There may be requests in the service level agreement where under a given event or set of events, the offset would change wherein the reservation slides closer or farther away from the current time to provide a guarantee of resources within ½ (instead of 1 hour) or 2 hours in the future. There are a variety of ways to vary the offset. One can be to simply cancel the current sliding reservation and create a new reservation at a different offset. Another way would be to maintain the current reservation but slide it closer or farther away from the current time. The factors that adjust the dynamic nature of the offset may be based on company requests, the nature and use of the cluster resources, the time the request is made, historical information, and so forth. For example, if the request for resources is made at midnight on a Friday night, perhaps instead of the 1 hour availability of resources, the hosting center analyzes the cluster resources and the time of the request and determines that it can deliver the resources in ½. The company may want a flexible offset where if the request is made during a block of time such as between 3-4:30 pm (near the end of the work day) that the offset be shortened so that the job can be processed sooner. The modifications to the offset may be automatic based on a feedback loop of information or may be adjustable by an administrator.

The dynamic aspect of the period of time in which the reservation mask slides ahead of the current time is discussed next. This aspect of the invention provides some flexibility in how soon resources need to be available after a request for a reservation. For example, if the fixed time offset 408 is three hours, a user submits a request for a reservation on Friday at 3:00 pm, the soonest the resources would be guaranteed to be available to process a submitted job is 6:00 pm. That may be beyond the time that the user desires to wait to submit a job. A dynamically modifiable period of time allows for some parameters that can move up the period of time in which the resources can be available.

Figure 2C:
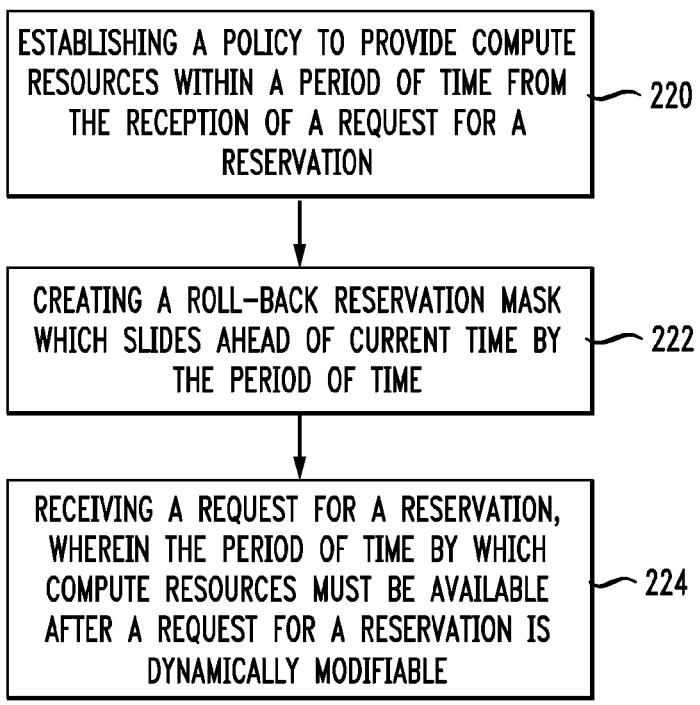
FIG. 2C illustrates a method embodiment of the invention.

FIG. 2C illustrates the method aspect of the invention in this regard. A method of managing compute resources within a compute environment comprises establishing a policy to provide compute resources within a period of time from the reception of a request for a reservation (220), creating a roll-back reservation mask which slides ahead of current time by the period of time (222) and receiving a request for a reservation, wherein the period of time by which compute resources must be available after a request for a reservation is dynamically modifiable (224).

The policy may be based on an agreement with a submitter of requests for reservations or a service level agreement. The period of time is dynamically modifiable based on a number of factors, such as parameters within the policy, events related to the compute environment (a cluster environment or a grid environment), historical information such as previous jobs submitted by the submitter, events related to a time associated with a job submission or the job submission itself, a request by a consumer or events related billing. As can be seen, there may be a number of factors that may play a role in an analysis of whether the period of time from which resources must be available after a request is received may be modified (increased or decreased).

Figure 5:
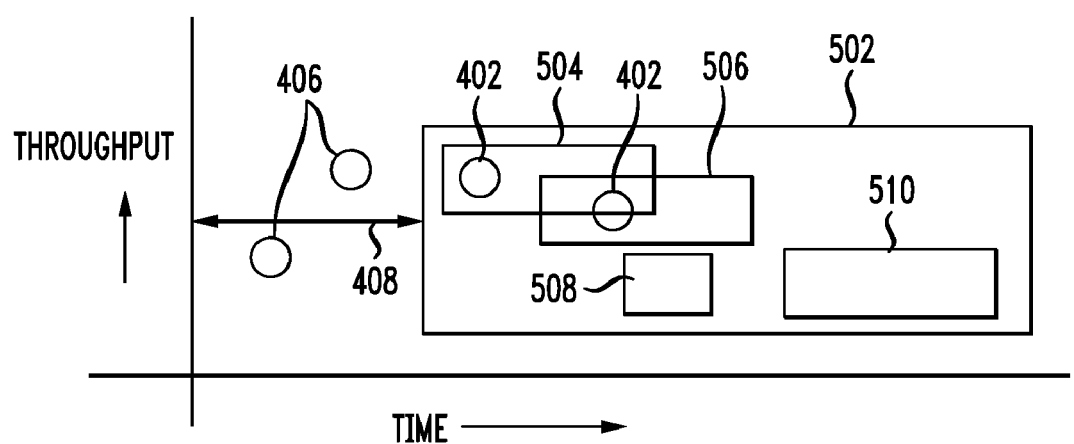
FIG. 5 illustrates another aspect of a roll-back reservation mask.

The reservation rollback policy mask is stackable allowing multiple different types of service or service level agreements to be simultaneously satisfied and share a collection of resources. This feature is illustrated in FIG. 5. A reservation 502 is shown and can generally be considered as an aggregation of requests from various masks 504, 506, 508 510. These are aggregated into one space 502 which will then allow reservations to be created on a first come first serve basis, or based on other factors. If these reservation masks 504, 506, 508 and 510 are stacked with individual offsets from the current time (not shown), the administrator can allow the masks to be partitioned among consumers. A useful component of this stackable approach is the capability to have an enveloping reservation 502 created with a total quantity of resource and rollback time offset 408 and a duration to the end of the SLA. Once that reservation space is established or paid for, as a service, the hosting center sub-partitions the space using reservations to provide service guarantees, response time guarantees, quantity or resources guarantees taking advantage of the stacking capability.

A company may therefore establish the enveloping reservation 502 and request from the hosting center that they partition the space according to various organizations within the enveloping reservation 502. This eliminates the need for a large entity to have its own group of clusters of computer.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method of managing compute resources within a multi-node compute environment, the method comprising:
   identifying a need type and a group of group of available compute resources within the multi-node compute environment to yield identified data;
   based on the identified data, creating a non-consumption reservation mask that comprises a policy enforcing mechanism to manage and constrain consumption sub-reservations of compute resources covered by the non-consumption reservation mask; and
   if a request from a consumer matches the need type, then constraining a creation of a consumption sub-reservation for compute resources such that the consumer can only use at least a portion of the compute resources covered by the non-consumption reservation mask, else, if the request does not match the need type, then not constraining the creation of the consumption sub-reservation.

2. The method of claim 1, wherein creating the non-consumption reservation mask further comprises specifying at least one timeframe during which the non-consumption reservation mask enforces constraints.

3. The method of claim 2, wherein the at least one time frame further comprises a plurality of independent time frames.

4. The method of claim 2, wherein the at least one time frame further comprises a plurality of regular, periodic timeframes.

5. The method of claim 1, wherein need type is a personal reservation that comprises a reservation that dedicates resource access to at least one of a user and a group of users.

6. The method of claim 5, wherein if the personal reservation provides access to resources to a group of users, then each reservation and reservation timeframe are determined by a user in the group of users that requests the respective reservation.

7. The method of claim 1, further comprising:
   modifying the consumption sub-reservation according to received data.

8. The method of claim 7, wherein the received data is at least one of resource usage, system performance, a policy and a criterion associated with the request.

9. The method of claim 7, wherein modifying the consumption sub-reservation is bounded by a minimum threshold and a maximum threshold.

10. The method of claim 7, wherein modifying the consumption sub-reservation further comprises modifying at least one of: an access control list, reserved resources and a time frame covered.

11. The method of claim 1, further comprising:
   creating a set of non-consumption reservation masks covering the multiple nodes, wherein multiple consumption sub-reservations created from multiple consumer requests are each constrained to only use at least a portion of the multiple nodes covered by the set of non-consumption reservation masks.

12. The method of claim 1, further comprising:
   specifying an access control list that constrains which consumers can utilize compute resources within the non-consumption reservation mask.

13. The method of claim 1, wherein the need type comprises at least one of: a particular use, a user, a group of users, a job source and a type of job submission.

14. A non-transitory computer-readable storage medium that stores instructions for controlling a computing device to manage compute resources in a multi-node compute environment, the instructions comprising:
   identifying a need type and a group of group of available compute resources within the multi-node compute environment to yield identified data;
   based on the identified data, creating a non-consumption reservation mask that comprises a policy enforcing mechanism to manage and constrain consumption sub-reservations of compute resources covered by the non-consumption reservation mask; and
   if a request from a consumer matches the need type, then constraining a creation of a consumption sub-reservation for compute resources such that the consumer can only use at least a portion of the compute resources covered by the non-consumption reservation mask, else, if the request does not match the need type, then not constraining the creation of the consumption sub-reservation.

15. The non-transitory computer-readable storage medium of claim 14, wherein the instructions further comprise modifying the consumption sub-reservation according to received data.

16. The non-transitory computer-readable storage medium of claim 15, wherein the received data is at least one of resource usage, system performance, a policy and a criterion associated with the request.

17. The non-transitory computer-readable storage medium of claim 15, wherein modifying the consumption sub-reservation is bounded by a minimum threshold and a maximum threshold.

18. The non-transitory computer-readable storage medium of claim 14, wherein the instructions further comprise:
    creating a set of non-consumption reservation masks covering the multiple nodes, wherein multiple consumption sub-reservations created from multiple consumer requests are each constrained to only use at least a portion of the multiple nodes covered by the set of non-consumption reservation masks.

19. The non-transitory computer-readable storage medium of claim 14, wherein the need type comprises at least one of: a particular use, a user, a group of users, a job source and a type of job submission.

20. A system for managing compute resources within a multi-node compute environment, the system comprising:
    a computer processor;
    a first module controlling the computer processor to identify a need type and a group of group of available compute resources within the multi-node compute environment to yield identified data;
    a second module controlling the computer processor, based on the identified data, to create a non-consumption reservation mask that comprises a policy enforcing mechanism to manage and constrain consumption sub-reservations of compute resources covered by the non-consumption reservation mask; and
    a third module controlling the computer processor, if a request from a consumer matches the need type, to constrain a creation of a consumption sub-reservation for compute resources such that the consumer can only use at least a portion of the compute resources covered by the non-consumption reservation mask, else, if the request does not match the need type, then not to constrain the creation of the consumption sub-reservation.

* * * * *